(12) United States Patent
Hasler

(10) Patent No.: US 8,416,595 B2
(45) Date of Patent: Apr. 9, 2013

(54) ARRANGEMENT FOR EXCHANGING POWER

(75) Inventor: Jean-Philippe Hasler, Vasteras (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 13/326,114

(22) Filed: Dec. 14, 2011

(65) Prior Publication Data

US 2012/0081939 A1 Apr. 5, 2012

Related U.S. Application Data

(63) Continuation of application No. PCT/EP2009/057627, filed on Jun. 18, 2009.

(51) Int. Cl.
*G05F 1/70* (2006.01)
*H02M 1/12* (2006.01)

(52) U.S. Cl.
USPC ............. 363/87; 363/39; 363/65; 323/208

(58) Field of Classification Search .............. 363/39,
363/148, 157, 44, 68, 84, 87, 89, 125, 127,
363/129, 65; 323/205, 207, 208, 209, 220,
323/225
See application file for complete search history.

(56) References Cited

U.S. PATENT DOCUMENTS 4,686,447 A * 8/1987 Takeda et al. ............... 323/210
5,532,575 A 7/1996 Ainsworth et al.
5,818,126 A * 10/1998 Mohan ............................ 307/85
5,852,559 A * 12/1998 Li ................................. 363/163

(Continued)

FOREIGN PATENT DOCUMENTS

| CN | 101345422 A | 1/2009 |
| DE | 10103031 A1 | 7/2002 |
| WO | 2008125493 A1 | 10/2008 |

OTHER PUBLICATIONS

Database WPI Week 20099 Thomson Scientific, London, GB; AN 2009-E29118-& CN 101 345 422 A (Univ Beijing Communication) Jan. 14, 2009 ; XP-002572563; 2 pages.

(Continued)

*Primary Examiner* — Gary L Laxton
(74) *Attorney, Agent, or Firm* — St. Onge Steward Johnston & Reens LLC

(57) ABSTRACT

An arrangement for exchanging power, in shunt connection, with a three-phase electric power network includes a Voltage Source Converter having at least three phase legs with each a series connection of switching cells. Each switching cell has at least two semiconductor assemblies connected in series and having each a semiconductor device of turn-off- type and a rectifying element connected in anti-parallel therewith and at least one energy storing capacitor. A control unit is configured to control the semiconductor devices of each switching cell and to deliver a voltage across the terminals thereof being zero or U, in which U is the voltage across the capacitor. The control unit is also configured to calculate a value for amplitude and phase position for a second negative sequence-current or a zero-sequence voltage or a value of a dc current.

15 Claims, 2 Drawing Sheets

U.S. PATENT DOCUMENTS

| | | | |
|---|---|---|---|
| 5,892,677 A * | 4/1999 | Chang | 363/152 |
| 6,075,350 A | 6/2000 | Peng | |
| RE37,126 E * | 4/2001 | Peng et al. | 363/137 |
| 7,782,643 B2 * | 8/2010 | Hara et al. | 363/148 |
| 7,800,929 B2 * | 9/2010 | Yamamoto et al. | 363/163 |
| 7,944,723 B2 * | 5/2011 | Crane | 363/127 |
| 8,207,712 B2 * | 6/2012 | Hasler | 323/208 |
| 2012/0063181 A1 * | 3/2012 | Chimento et al. | 363/56.03 |
| 2012/0069612 A1 * | 3/2012 | Hasler | 363/71 |
| 2012/0086412 A1 * | 4/2012 | Chimento et al. | 323/207 |
| 2012/0092906 A1 * | 4/2012 | Hasler | 363/39 |

OTHER PUBLICATIONS

Peng et al, "A multilevel voltage-source inverter with separate DC sources for Static Var generation", IEEE Transactions on Industry Applications, vol. 32, No. 5, Sep./Oct. 1996, pp. 1130-1138.

International Preliminary Report on Patentability; Application No. PCT/EP2009/057627; Issued: Sep. 13, 2011; 7 pages.

International Search Report and Written Opinion of the International Searching Authority; Application No. PCT/EP2009/057627: Issued: Mar. 11, 2010; Date of Mailing: Apr. 8, 2010; 14 pages.

* cited by examiner

ARRANGEMENT FOR EXCHANGING POWER

CROSS-REFERENCE TO RELATED APPLICATIONS

The present application is a continuation of pending International patent application PCT/EP2009/057627 filed on Jun. 18, 2009 which designates the United States and the content of which is incorporated herein by reference.

FIELD OF THE INVENTION

The present invention relates to the technical field of exchanging power with a three-phase electric power network with different aims, such as for obtaining reactive power compensation, stabilize the electric power network and reduce disturbances therein, such as reducing harmonics in the network generated by a load connected thereto.

Compensation of reactive power flows in electric power networks conventionally occurs, inter alia, by connection of reactive impedance elements in the form of inductors and capacitors in shunt connection to the power network. By connecting a semiconductor switch in series with such an inductor the current through the inductor may be controlled and hence also the exchange of reactive power with said network. By connecting a semiconductor switch in series with such a capacitor and control thereof reactive power supply to the power network may be controlled in steps. Capacitors connected in shunt connection are used primarily in industrial networks to compensate for reactive power consumption in for example large asynchronous motors. Another application of such an arrangement is in connection with loads with a greatly varying reactive power consumption, such as in industrial arc furnaces, where instability with respect to power transmitted through the different phases of the network may occur.

BACKGROUND OF THE INVENTION

An arrangement of this type is known through for example U.S. Pat. No. 5,532,575 and the article "A Multilevel Voltage-Source inverter with Separate DC Sources for Static Var Generation", 1995 IEEE, pages 2541-2548. A Voltage Source Converter having phase legs formed by a so-called chain-link of H-bridge cells each having at least one energy storing capacitor is there used in an arrangement for exchanging power with a three-phase electric power network. The advantage of such a use is that already at a comparatively low number of such switching cells connected in series a comparatively high number of different levels of said voltage pulse delivered by the converter may be obtained, so that a said voltage with fundamental frequency having a shape being very close to a sinusoidal voltage may be obtained already without any smoothing filters. Furthermore, this may be obtained already by means of substantially lower switching frequencies than used in two or three level Voltage Source Converters. Furthermore, this makes it possible to obtain substantially lower losses and also reduces problems of filtering and harmonic currents and radio interferences, so that equipment therefor may be less costly. This altogether results in both a better performance of the arrangement and saving of costs with respect to such arrangements having converters with no energy storing capacitors built in into the switching cells.

It is of importance for reliable and efficient operation of such an arrangement that the energy stored in the capacitor of each switching cell of the converter is kept constant for keeping the direct voltage of each said cell constant. This implies that the converter in this known arrangement having wye-connected phase legs can only generate reactive power, i.e. the current component is a positive-sequence current and is in quadrature to the voltage at the respective phase leg terminal of the converter. This is due to the fact that when a negative-sequence current is generated by a wye-connected converter and a positive-sequence voltage is assumed, then the energy in said capacitors will increase/decrease between phases resulting in direct voltage variations across the capacitors.

However, it may in some situations be very important to be able to create a negative-sequence current in order to move power from one of the phases of the power network to the other for obtaining balance of the power flow in an instable network or otherwise reducing disturbances in the network.

It is of course an ongoing attempt to improve arrangements of the type defined in the introduction.

SUMMARY OF THE INVENTION

The object of the present invention is to provide an arrangement of the type defined in the introduction being improved in at least some aspect with respect to such arrangements already known.

This object is according to the invention obtained by providing such an arrangement, which is characterized in that each said switching cell has on one hand at least two semiconductor assemblies connected in series and having each a semiconductor device of turn-off type and a rectifying element connected in anti-parallel therewith and on the other at least one energy storing capacitor as well as two terminals connecting the cell to adjacent cells in said series connection of switching cells, that the three phase legs of the Voltage Source Converter are at one first end thereof interconnected in a neutral point hanging freely by forming a wye-connection and at the other second end connected to a phase each of said three-phase electric power network, that the arrangement further comprises means configured to detect electrical conditions of said three phase electric power network and a control unit configured to control said semiconductor devices of said semiconductor assemblies of each switching cell and by that each switching cell dependent upon information received from said detecting means to deliver a voltage across the terminals of each said switching cell being zero or U, in which U is the voltage across said capacitor, for together with other switching cells of the phase leg at said second end deliver a voltage pulse being the sum of the voltages so delivered by each switching cell, and that said control unit is configured, upon receipt of information from said detecting means causing a need to generate a negative-sequence current, to calculate a value for amplitude and phase position for a second negative-sequence current or a zero-sequence voltage or a value of a dc current for which, when added to said three phase legs upon generation of said negative-sequence current, the resulting energy stored in said energy storing capacitors in each said phase leg will be constant and to control the semiconductor devices of said switching cells of the phase legs to add such a zero-sequence voltage, second negative-sequence current or dc current to the currents and voltages, respectively, of each phase leg of the converter.

Thus, the present inventor has realized that it is possible to utilize a so-called M2LC-converter having two-level switching cells as disclosed in for instance DE 101 03 031 A1 in an arrangement of this type by not connecting the DC poles to any line as in that case but instead interconnecting the three phase legs of the converter at one end in a neutral point hanging freely by forming a wye-connection and at the other second end connecting them to a phase each of a three-phase electric power network. Furthermore, by designing the control unit to calculate said zero-sequence voltage or said currents and add this to the reference current and voltage, respectively, when controlling the semiconductor devices of the switching cells of each phase leg of the converter a negative-sequence current may be generated when a need thereof arises while ensuring that the voltage and the current in each phase will be in quadrature and by that no charging or discharging of any capacitor will occur, so that the resulting energy stored in the capacitors in each phase will be constant. Instabilities in said power network, for instance due to great variations in the power consumption of an electric arc furnace connected thereto or flicker, may be compensated by creating a negative-sequence current moving power from one of the phases to another by just carrying out such calculation and control of semiconductor devices of the switching cells for the negative-sequence current desired to be generated.

According to an embodiment of the invention said Voltage Source Converter has only three phase legs, which are at said second end only connected to a phase each of said three phase electric power network, and said control unit is configured, upon receipt of information from said detecting means causing a need to generate a negative-sequence current, to calculate a value for amplitude and phase position for a zero-sequence voltage for which, when added to said three phase legs upon generation of said negative-sequence current, the resulting energy stored in said energy storing capacitors in each said phase leg will be constant and to control the semiconductor devices of said switching cells of the phase legs to add such a zero-sequence voltage to the voltages of each phase leg of the converter. Thus, it has been found that such a so-called half-converter of the M2LC-type with two-level switching cells may in fact be used in an arrangement of this type to generate a negative-sequence current while keeping the resulting energy stored in the energy storing capacitors in each said phase leg at a constant level by calculating a zero-sequence voltage reference to be added to the voltage reference for the control of said semiconductor devices. This means that an arrangement which may efficiently take care of said instabilities in a said power network may be provided to a cost being comparatively low in this context.

According to another embodiment of the invention said Voltage Source Converter comprises three further, second phase legs identical to said three phase legs first mentioned at one first end interconnected in a neutral point hanging freely by forming a wye-connection and at the other second end connected to a phase each of said three phase electric power network as well as to one said second end each of said three phase legs first mentioned, and that said control unit is configured, upon receipt of information from said detecting means causing a need to generate a negative-sequence current, to calculate a value for amplitude and phase position for a second negative-sequence current or a dc current for which, when added to said six phase legs upon generation of said negative-sequence current, the resulting energy stored in said energy storing capacitors in each said phase leg will be constant and to control the semiconductor devices of said switching cells of the phase legs to add such a negative-sequence current or dc current to the currents of each phase leg of the converter. By using such a so-called full M2LC-converter in said arrangement it will be possible to add a second negative-sequence current or a dc current for keeping the resulting energy stored in the energy storing capacitors in each phase leg constant while generating a negative-sequence current, which results in a possibility to have less switching cells connected in series in each phase leg than when using a zero-sequence voltage reference, so that costs for such cells may be saved. Furthermore, the use of such a Voltage Source Converter in a said arrangement results in a possibility to handle higher powers than in the embodiment with a half M2LC-converter topology, and the control of such a converter will also be less complicated. The currents thus generated may be DC currents generated within the converter, in which the DC current of the same phase (phase legs interconnected at said second end) of the two half converters in such an arrangement is of equal magnitude but phase opposite and the sum of the DC currents of all three phases is then zero, so that no DC current is flowing out of the converter. The currents may also be a second negative-sequence current circulating only within the converter.

It is pointed out that the expression "keeping the resulting energy stored in the energy storing capacitors in each phase leg constant" is in this disclosure to be interpreted broadly and shall also cover the case of adding a zero-sequence current or voltage for restoring energy balance between the phase legs should an unbalance have occurred.

According to another embodiment of the invention each phase leg of the Voltage Source Converter has a reactive impedance element connected in series therewith for influencing the flow of reactive power between the arrangement and said network, and this reactive impedance element comprises according to another embodiment of the invention a capacitor and to a further embodiment of the invention an inductor for reactive power generation and consumption of reactive power, respectively.

According to another embodiment of the invention the number of switching cells of said series connection of switching cells in each phase leg of the Voltage Source Converter is $\geq 4$, $\geq 8$ or $\geq 12$. Although a cost saving of an arrangement of this type is obtained by the reduced number of switching cells connected in series required, the use of a converter of this type is particularly interesting when the number of switching cells in said series connection is rather high resulting in a high number of possible levels of the voltage pulses delivered by the converter.

According to another embodiment of the invention said semiconductor devices of said semiconductor assemblies are IGBTs (Insulated Gate Bipolar Transistor), IGCTs (Integrated Gate Commutated Thyristor) or GTOs (Gate Turn-Off thyristor). These are suitable semiconductor devices for such converters, although other semiconductor devices of turn-off type are also conceivable.

According to another embodiment of the invention said Voltage Source Converter has a capacity to together with said reactive impedance element connected in series therewith generate a voltage with a fundamental frequency being equal to the fundamental frequency of the voltage of the respective phase of the electric power network with an amplitude of 20 kV-500 kV, preferably 30 kV-200 kV. Such an arrangement will be suitable for exchanging power with for instance a high-voltage transmission line typically carrying a voltage of 132-500 kV or a power network feeding an industrial arc furnace with a fundamental voltage of 36 kV.

The present invention also relates to a method of generating a negative-sequence current in an arrangement for exchanging power, in shunt connection, with a three-phase electric power network. The advantages and advantageous features of such a method and of the methods according to the embodiments of the invention appear clearly from the above discussion of different embodiments of an arrangement according to the invention.

The invention also relates to a use of an arrangement according to the invention for exchanging power with a three-phase electric power network, in which preferable such uses are for exchanging power with the power network feeding an industrial arc furnace and with a three-phase electric power network in the form of a high-voltage transmission line.

Further advantages as well as advantageous features of the invention will appear from the following description.

DETAILED DESCRIPTION OF THE INVENTION

Figure 1:
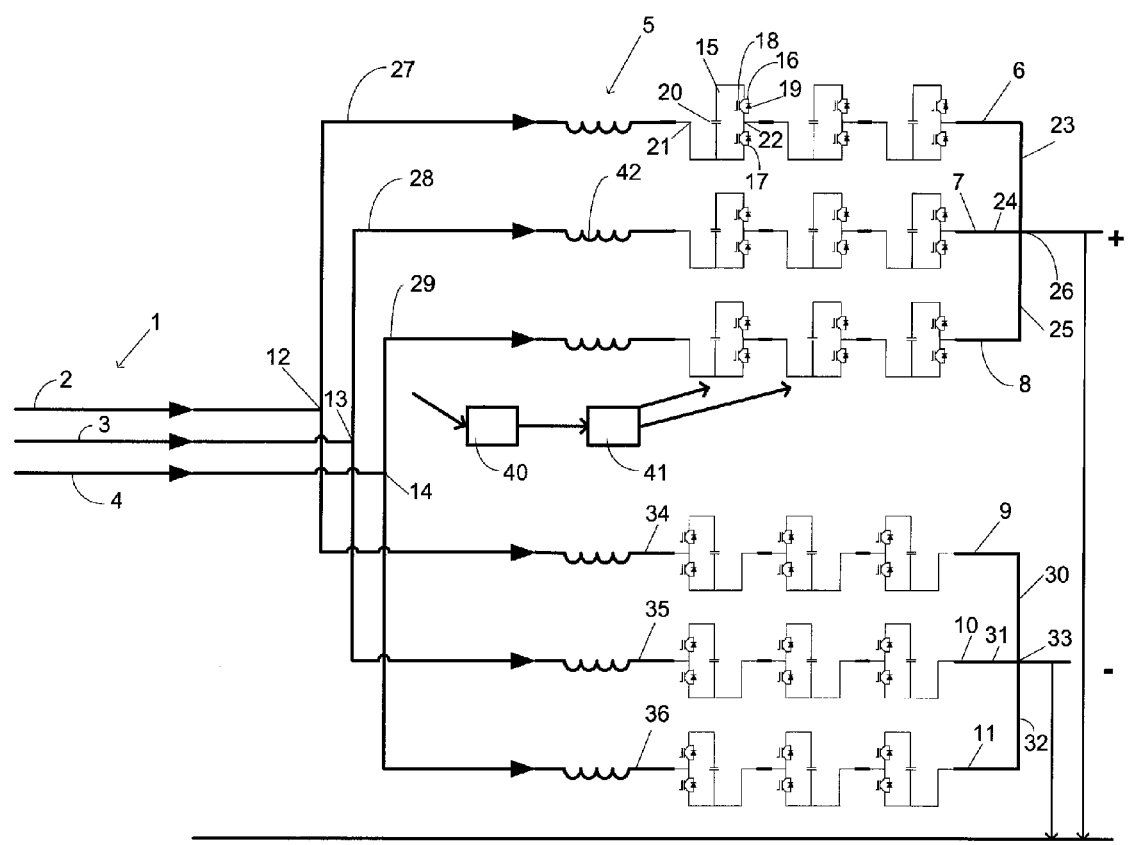
FIG. 1 is a very simplified view showing the general structure of an arrangement according to a first embodiment of the invention.

FIG. 1 schematically illustrates the general structure of an arrangement according to a first embodiment of the invention for exchanging power, in shunt connection, with a three-phase electric power network 1 of any conceivable type and here indicated by three phase lines 2-4 thereof. This network may for instance be a power network feeding an industrial arc furnace or any other equipment typically operating with a voltage of 36 kV. If the arrangement is to be connected to a network in the form of a high-voltage transmission line, which typically carries a much higher voltage, such as in the order of 132-500 kV, the arrangement is to be connected thereto through a transformer not shown in FIG. 1.

The arrangement comprises a Voltage Source Converter 5 having a full M2LC-converter topology by having six sub-phase legs 6-11 interconnected in couples 6 and 9, 7 and 10 and 8 and 11 with a mid point 12-14 of each such couple forming an output for connection to a phase 2-4 each of the three-phase electric power network.

Said sub-phase legs have each a series connection of switching cells 15. Each such switching cell has on one hand at least two semiconductor assemblies 16, 17 connected in series and having each a semiconductor device 18 of turn-off type, such as for instance an IGBT, and a rectifying element 19, such as a free-wheeling diode, connected in anti-parallel therewith and on the other at least one energy storing capacitor 20 having a voltage across the terminals thereof of U as well as two terminals 21, 22 connecting the cell to adjacent cells in said series connection of switching cells. Three such sub-phase legs 6-8 are at one first end 23-25 thereof interconnected in a neutral point 26 hanging freely by forming a wye-connection and at the other second end 27-29 connected to a phase each of said three-phase electric power network. This applies also to the three sub-phase legs 9-11 having such first ends 30-32, neutral point 33 and second ends 34-36, in which the second ends 34-36 are also each connected to one second end 27-29 first mentioned each.

A means 40 configured to detect electrical conditions of a said three-phase electric power network is indicted at 40. Such conditions may be amplitudes and phase positions of currents and voltages in the three phases 2-4, through which also disturbances and harmonics may be discovered. The detecting means 40 is configured to send information about said electrical conditions further to a control unit 41, which is configured to control the semiconductor devices of the switching assemblies of each switching cell and by that each switching cell dependent upon information received from the detecting means 40 to deliver a voltage across the terminals of each said switching cell being zero or U, in which U is the voltage across said capacitor 20 of the switching cell, for together with other switching cells of the respective phase leg 6-11 deliver a voltage pulse being the sum of the voltages so delivered by each switching cell.

More exactly, the control unit 41 is configured to control the switching cells of the Voltage Source Converter in the following way upon receipt of information from said detecting means 40 that there is a need to generate a negative-sequence current for compensating instabilities in the electric power network 1. The control unit will then calculate a value for amplitude and phase position for a second negative-sequence current or a value of a dc current for which, when added to said phase legs of the converter upon generation of the negative-sequence current, the resulting energy stored in the energy storing capacitors in each phase leg will be constant and to control the semiconductor devices of the switching cells of the phase legs to add such a zero-sequence current to the currents of each phase leg of the converter. A DC current of one and the same phase, such as 6 and 9, of the two half converters is then of equal magnitude but phase opposite and the sum of the DC currents of all three phases is zero, so that no DC current is flowing out of the arrangement. These DC currents depend on the negative-sequence current and are given by the equation below:

$$\begin{bmatrix} I_{DC,2} \\ I_{DC,3} \\ I_{DC,4} \end{bmatrix} = -\frac{2U_{AC}}{U_{DC}} Re \left[ \vec{I}_n^* \begin{bmatrix} 1 \\ \alpha \\ \alpha^2 \end{bmatrix} \right]$$

in which $\vec{I}_n^*$ is the negative-sequence current and $$\alpha = e^{j\frac{2\pi}{3}}.$$

This DC current for the respective phase 2-4 is also used to balance the DC capacitor 20 voltage of the cell when a negative-sequence current is generated by the converter. The DC voltage unbalances between the six DC capacitor groups can be expressed as the common mode and differential mode as defined below:

The DC unbalance for each half converter can be defined as a vector:

$$\vec{I}_{DC,Unb} = (2U_{DC,A} - U_{DC,B} - U_{DC,C})/3 + j*(U_{DC,B} - U_{DC,C})/\sqrt{3}$$

The common mode for the Upper and Lower half converter is defined as:

$$\vec{I}_{DC,Common} \vec{I}_{DC,Unb\ Upper} + \vec{I}_{DC,Unb\ Lower}$$

The differential modes are defined for each half converter:

$$\vec{I}_{DC\ Upper,Diff} = \vec{I}_{DC,Unb\ Upper} - \frac{1}{2}\vec{I}_{DC,Common}$$

$$\vec{I}_{DC\ Lower,Diff} = \vec{I}_{DC,Unb\ Lower} - \frac{1}{2}\vec{I}_{DC,Common}$$

The common mode is added to the negative-sequence current to define the DC component for each phase.

$$\begin{bmatrix} I_{DC,a} \\ I_{DC,b} \\ I_{DC,c} \end{bmatrix} = -\frac{2U_{AC}}{U_{DC}} Re \left[ (\vec{I}_n^* + G_s \vec{I}_{DC,Common}^*) \begin{bmatrix} 1 \\ \alpha \\ \alpha^2 \end{bmatrix} \right] U_{AC}$$

To balance the differential mode of the DC capacitor group, a negative-sequence current is generated by each half converter independently of each other.

Figure 2:
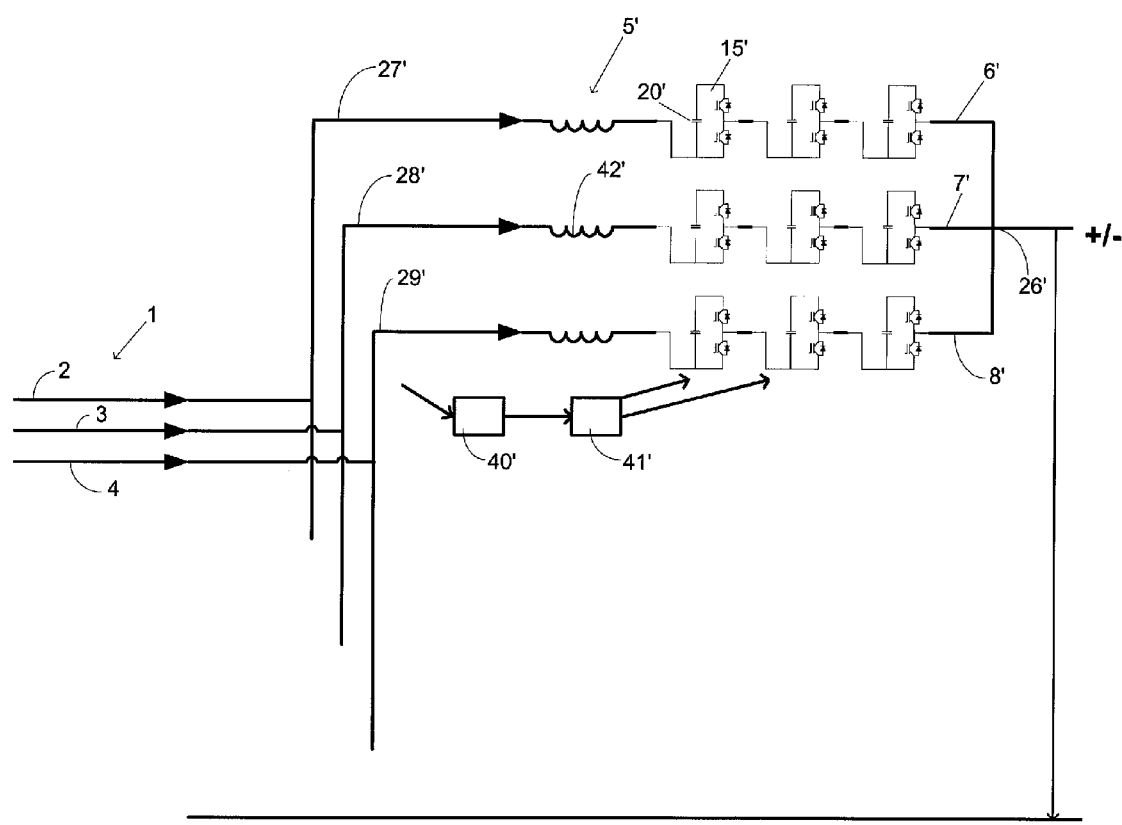
FIG. 2 is a view similar to FIG. 1 of an arrangement according to a second embodiment of the invention.

FIG. 2 shows an arrangement according to a second embodiment of the invention, which differs from the one according to FIG. 1 by the fact that the Voltage Source Converter here has a half M2LC-converter topology, which means that it has only three sub-phase legs 6', 7' and 8'. Parts of this arrangement corresponding to parts of the arrangement shown in FIG. 1 are provided with the same reference numerals with a prim (') added thereto. It is in this case not possible to use a current reference and add a zero-sequence current thereto when there is a need to generate a negative-sequence current and the resulting energy stored in the energy storing capacitors in each phase leg shall be kept constant, but it is instead possible to calculate a value for amplitude and phase position for a zero-sequence voltage for which, when added to said three phase legs upon generation of said negative-sequence current, the resulting energy stored in said energy storing capacitors in each said phase leg will be constant and to control the semiconductor devices of the switching cells of the phase legs to add such a zero-sequence voltage to the voltages of each phase leg of the converter. The zero-sequence voltage to be added to the converter voltage reference will depend on the positive- and negative-sequence current generated by the converter and also on a possible DC voltage unbalance between the phases.

Furthermore, it is shown in FIGS. 1 and 2 how the arrangements may have reactive impedance elements connected in series with each phase leg of the converter, such as an inductor for reactive power consumption and a capacitor for reactive power generation, and such a reactive impedance element in the form of an inductor 42 is indicated in the Figures. This inductor may also function for smoothing the voltage generated by the converter.

The invention is of course not in any way restricted to the embodiments described above, but many possibilities to modifications thereof will be apparent to a person skilled in the art without departing from the scope of the invention.

What is claimed is:

1. An arrangement for exchanging power, in shunt connection, with a three-phase electric power network, said arrangement comprising:
   a Voltage Source Converter having at least three phase legs, each of the at least three phase legs having a series connection of switching cells,
   wherein each one of said switching cells has at least two semiconductor assemblies connected in series, semiconductor device of turn-off type, and a rectifying element connected in anti-parallel therewith,
   wherein each one of said switching cells has at least one energy storing capacitor and two terminals connecting each of the switching cells to adjacent switching cells in said series connection of switching cells,
   wherein the at least three phase legs of the Voltage Source Converter are interconnected at a first end in a neutral point hanging freely by forming a wye-connection,
   wherein the at least three phase legs of the Voltage Source Converter are connected at a second end to said three-phase electric power network;
   wherein the arrangement further comprises:
   detecting means configured to detect electrical conditions of said three-phase electric power network; and
   a control unit configured to control said semiconductor devices of said semiconductor assemblies of each of said switching cells,
   wherein each of said switching cells is dependent upon information received from said detecting means to deliver a voltage across the terminals of each of said switching cells, the voltage being zero or U, in which U is the voltage across said at least one energy storing capacitor,
   wherein together with other switching cells of the phase leg at said second end, each of said switching cells delivers a voltage pulse being the sum of the voltages so delivered by each switching cell, and
   wherein said control unit is configured, upon receipt of information from said detecting means causing a need to generate a negative-sequence current, to calculate a value for amplitude and phase position for a second negative-sequence current or a zero-sequence voltage or a value of a dc current for which, when added to said three phase legs upon generation of said negative-sequence current, the resulting energy stored in said energy storing capacitors in each said phase leg will be constant and to will control the semiconductor devices of said switching cells of the least three phase legs to add such a zero-sequence voltage, second negative-sequence current or dc current to the currents and voltages, respectively, of each phase leg of the converter.

2. The arrangement of claim 1, wherein said Voltage Source Converter has only said three phase legs, which are at said second end connected to a said three phase electric power network, and
   wherein said control unit is configured, upon receipt of information from said detecting means causing a need to generate a negative-sequence current, to calculate a value for amplitude and phase position for a zero-sequence voltage for which, when added to said three phase legs upon generation of said negative-sequence current, the resulting energy stored in said energy storing capacitors in each said phase leg will be constant and to control the semiconductor devices of said switching cells of the least three phase legs to add such a zero-sequence voltage to the voltages of each phase leg of the converter.

3. The arrangement of claim 1, wherein said Voltage Source Converter further comprises three, second phase legs identical to said three phase legs and
   wherein at the other second end, the second phase legs are connected to a said three phase electric power network and to each of said three phase legs, and
   wherein said control unit is configured, upon receipt of information from said detecting means causing a need to generate a negative-sequence current, to calculate a value for amplitude and phase position for a second negative-sequence current or a dc current for which, when added to said six phase legs upon generation of said negative-sequence current, the resulting energy stored in said energy storing capacitors in each said phase leg will be constant and to control the semiconductor devices of said switching cells of the six phase legs to add such a second negative-sequence current or dc current to the currents of each phase leg of the converter.

4. The arrangement of claim 1, wherein each phase leg of the Voltage Source Converter has a reactive impedance element connected in series therewith.

5. The arrangement of claim 4, wherein said reactive impedance element comprises an inductor.

6. The arrangement of claim 4, wherein said reactive impedance element comprises a capacitor.

7. The arrangement of claim 1, wherein the number of switching cells in each phase leg of said Voltage Source Converter is $\geq 4$.

8. The arrangement of claim 1, wherein said semiconductor devices of said semiconductor assemblies are IGBTs (Insulated Gate Bipolar Transistor); IGCTs (Integrated Gate Commutated Thyristor) or GTOs (Gate Turn-Off thyristor).

9. The arrangement of claim 1, wherein said Voltage Source Converter has a capacity together with said reactive impedance element connected in series therewith to generate a voltage with a fundamental frequency being equal to the fundamental frequency of the voltage of the respective phase of the electric power network with an amplitude of 20 kV-500 kV.

10. A method of generating a negative-sequence current in an arrangement for exchanging power, in shunt connection, with a three-phase electric power network, in which said arrangement comprises:
  a Voltage Source Converter having at least three phase legs, each of the at least three phase legs having a series connection of switching cells, each
  wherein each one of said switching cells has at least two semiconductor assemblies connected in series, a semiconductor device of turn-off type and a rectifying element connected in anti-parallel therewith,
  wherein each one of said switching cells has at least one energy storing capacitor and two terminals connecting each of the switching cells to adjacent switching cells in said series connection of switching cells,
  wherein the three phase legs of the Voltage Source Converter are interconnected at one first end in a neutral point hanging freely by forming a wye-connection and
  wherein the three phase legs of the Voltage Source Converter are connected at a second end to said three phase electric power network, said method comprises the steps of:
    detecting electrical conditions of said three-phase electric power network, and
    controlling said semiconductor devices of said semiconductor assemblies of each switching cell, wherein each of the switching cells is dependent upon information from said detection step to deliver a voltage across the terminals of said switching cells, the voltage being zero or U, in which U is the voltage across said at least one energy storing capacitor, wherein together with other switching cells of the phase leg at said second end, each of said switching cells delivers a voltage pulse being the sum of the voltages so delivered by each switching cell,
  wherein the method further comprises the steps of:
    calculating, upon detection of a need to generate a negative sequence current, a value for amplitude and phase position for a second negative sequence-current or a zero-sequence voltage or a value of a dc current for which, when added to said three-phase legs upon generation of said negative-sequence current, the resulting energy stored in said energy storing capacitors in each said phase leg will be constant, and
    controlling the semiconductor devices of said switching cells of the least three phase legs to add such a zero-sequence voltage, second negative-sequence current or dc current calculated to the currents and voltages, respectively, of each phase leg of the converter.

11. The method of claim 10, wherein the method is carried out for a Voltage Source Converter having only said three phase legs, which are at said second end connected to said three phase electric power network,
  wherein said step of calculating a value for amplitude and phase position for a zero-sequence voltage for which, when added to said three phase legs upon generation of said negative-sequence current, the resulting energy stored in said energy storing capacitors in each said phase leg will be constant is calculated, and
  wherein said step of controlling the semiconductor devices of said switching cells of the three phase legs are controlled to add such a zero-sequence voltage calculated to the voltages of each phase leg of the converter.

12. The method of claim 10, wherein the method is carried out for a Voltage Source Converter having three additional second phase legs identical to said three phase legs first mentioned at one first end interconnected in a neutral point hanging freely by forming a wye-connection and
  wherein the three additional second phase legs are connected to said three phase electric power network at the second end and to each of said three phase legs,
  wherein said step of calculating a value for amplitude and phase position for a second negative-sequence current or a dc current for which, when added to said three phase legs upon generation of said negative-sequence current, the resulting energy stored in said energy storing capacitors in each said phase leg will be constant is calculated, and
  wherein said step of controlling the semiconductor devices of said switching cells of the six phase legs are controlled to add such a second negative-sequence current or dc current calculated to the currents of each phase leg of the converter.

13. A method of using an arrangement for exchanging power with a three-phase electric power network, the arrangement comprising:
  a Voltage Source Converter having at least three phase legs, each of the at least three phase legs having a series connection of switching cells,
  wherein each one of said switching cells has at least two semiconductor assemblies connected in series, a semiconductor device of turn-off type, and a rectifying element connected in anti-parallel therewith and
  wherein each one of said switching cells has at least one energy storing capacitor and two terminals connecting each of the switching cells to adjacent switching cells in said series connection of switching cells,
  wherein the at least three phase legs of the Voltage Source Converter are interconnected at a first end in a neutral point hanging freely by forming a wye-connection and
    wherein the at least three phase legs of the Voltage Source Converter are connected at a second end to said three-phase electric power network,
  wherein the arrangement further comprises
  detecting means configured to detect electrical conditions of said three-phase electric power network and
  a control unit configured to control said semiconductor devices of said semiconductor assemblies of each of said switching cells,
  wherein each of said switching cells is dependent upon information received from said detecting means to deliver a voltage across the terminals of each of said switching cells, the voltage being zero or U, in which U is the voltage across said at least one energy storing capacitor,
  wherein together with other switching cells of the phase leg at said second end, each of said switching cells delivers a voltage pulse being the sum of the voltages so delivered by each switching cell, and wherein said control unit is configured, upon receipt of information from said detecting means causing a need to generate a negative-sequence current, to calculate a value for amplitude and phase position for a second negative-sequence current or a zero-sequence voltage or a value of a dc current for which, when added to said three phase legs upon generation of said negative-sequence current, the resulting energy stored in said energy storing capacitors in each said phase leg will be constant and to will control the semiconductor devices of said switching cells of the least three phase legs to add such a zero-sequence voltage, second negative-sequence current or dc current to the currents and voltages, respectively, of each phase leg of the converter.

14. The method of claim 13, wherein said power network feeds an industrial arc furnace and carries a voltage of 36 kV.

15. The method of claim 13, wherein the method involves use of a high-voltage transmission line, which typically carries a voltage of 132-500 kV.

* * * * *